Oct. 7, 1969             O. NIEPMANN            3,470,779
DEVICE FOR CUTTING OUT THE PULLING OF A BAND OR THE
LIKE USED FOR RIPPING OPEN WRAPPINGS
Filed Nov. 28, 1966            2 Sheets-Sheet 1
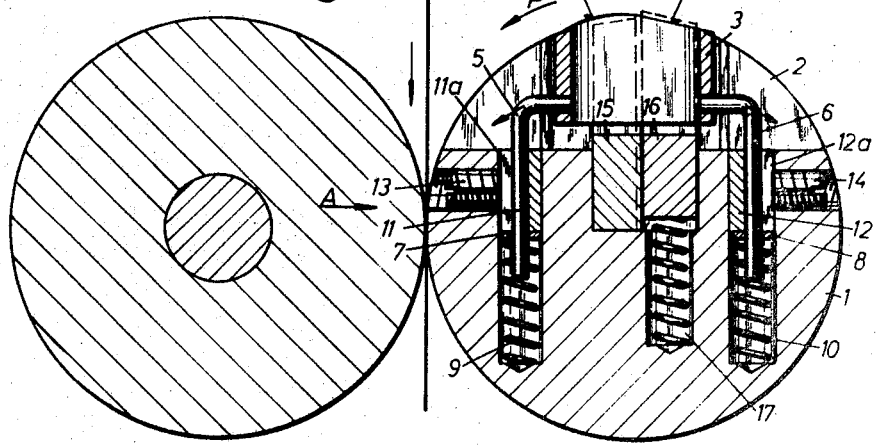
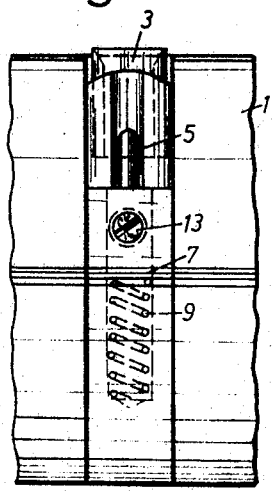
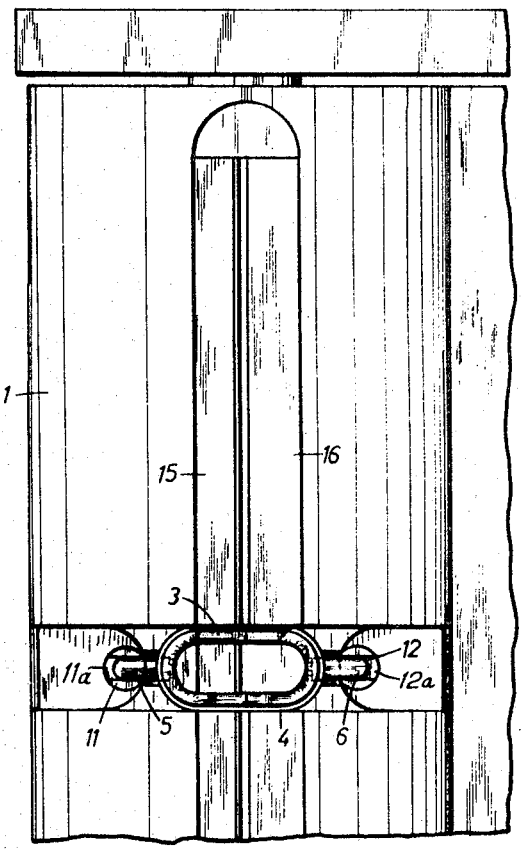

Oct. 7, 1969 O. NIEPMANN 3,470,779
DEVICE FOR CUTTING OUT THE PULLING OF A BAND OR THE
LIKE USED FOR RIPPING OPEN WRAPPINGS
Filed Nov. 28, 1966 2 Sheets-Sheet 2
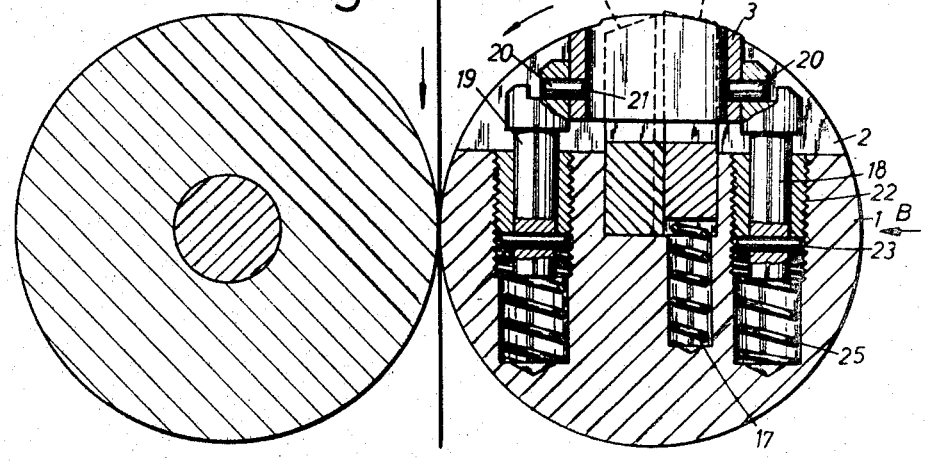
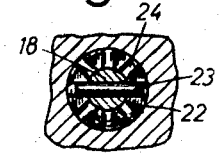
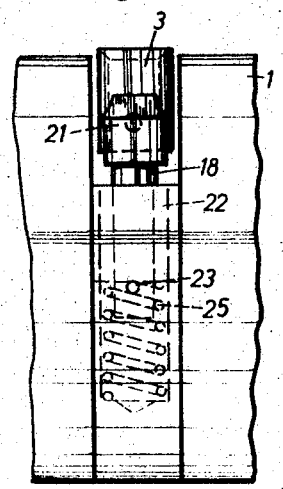
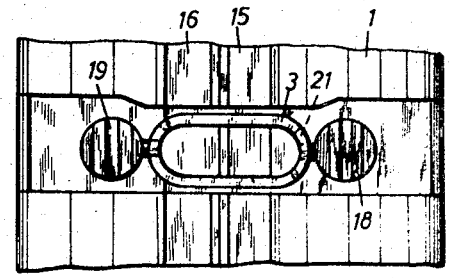

United States Patent Office 3,470,779
Patented Oct. 7, 1969

3,470,779
DEVICE FOR CUTTING OUT THE PULLING OF A BAND OR THE LIKE USED FOR RIPPING OPEN WRAPPINGS
Otto Niepmann, Gevelsberg, Germany, assignor to Fr. Niepmann & Co., Gevelsberg, Germany
Filed Nov. 28, 1966, Ser. No. 597,354
Claims priority, application Germany, Nov. 30, 1965, M 67,466
Int. Cl. B23d 25/02; B26d 1/56
U.S. Cl. 83—300                    9 Claims

ABSTRACT OF THE DISCLOSURE

A device for cutting the pulling end of a ripping band for an article wrapper. A rotatable roller has slot-like recess means in which band cutting means, arranged to be movable toward all sides due to the clearance thereabout, has direct support of resiliently adjustable bolt means arranged in the roller which also carries combined transverse wrapper cutting means.

The present invention relates to a device for cutting out the end of a ripping band from webs of foil provided with said pulling end. Webs of foil of this type serve for wrapping articles, as for instance cigarette packs.

Cutting devices are known in which the cutting knife is connected to a roller or the like which cooperates with a smooth hardened counter roller. In this connection, knives are employed, the cutting edge of which corresponds to the contour of the cut out edge of the pulling end of the band.

The knives are connected to rotating holding means and are in part rigidly connected to the knife holder and in part are movably and resiliently mounted in guiding means and are adapted to yield in the direction of the axis of rotation. These heretofore known designs have the drawback that the cutting edges must be ground to high precision and that a precise adjustment is time consuming and difficult. Moreover, the heretofore known devices of the type involved are expensive inasmuch as they require a separate drive.

It is, therefore, an object of the present invention so to arrange the cutting out knife that its cutting edge can a any time snugly engage the hardened counter roller so as to improve the cutting effect.

It is another object of this invention to provide a device for cutting out the pulling end of a ripping band, which will be relatively inexpensive and highly reliable.

These and other objects and advantages of the invention will appear more closely from the following specification in connection with the accompanying drawings, in which:

FIG. 1 illustrates a cross section through a roller and a knife supported thereby as used in connection with the present invention.

FIG. 2 is a view of FIG. 1 as seen in the direction of the arrow A.

FIG. 3 is a top view of FIG. 1.

FIG. 4 illustrates a cross section through a modified roller with knife according to the invention.

FIG. 5 shows the end view of a thread bushing used in connection with the arrangement of FIG. 4.

FIG. 6 illustrates a view of FIG. 4 as seen in the direction of the arrow B.

FIG. 7 is a top view of FIG. 4.

The device according to the present invention is characterized primarily in that the rotating knife which is mounted in the roller so as to be movable in all directions is held by two resilient bolts which are arranged in the direction of rotation of the roller. This way of mounting with play and holding of the knife by resilient bolts permits a universal movability of the knife so that the cutting edge of the knife will adapt itself in a simple and convenient manner to the counter roller of the cutting knife whereby any time consuming setting of the knife will become unnecessary.

According to a practical embodiment of the invention, the resilient bolts may be built into slit clamping bushings or into threaded bushings. The bolts are provided with an abutment, for instance an abutment disc, or a transverse pin adapted to engage one end face of the bushing. When the bolt is designed in the form of a hook-shaped pin, the hook can be bent laterally into the slit of the clamping bushing in order to be able to pull the tip of the hook out of the knife whereby the knife can be withdrawn from its holding means, for instance for purposes of post-grinding the knife.

If desired, the bolt may be provided with small holding pins which can be tilted into the lateral slits of the knife in order to fasten or release the knife. The inner end face of a threaded bushing may be provided with depressions for the transverse pin in order to be able to post-adjust the bushing if this should become necessary after a knife has been post-ground.

Such band knife may, in a manner known per se, be mounted on a roller-shaped arm and may be built into the remining portion of the device. It is particularly advantageous to arrange the said band knife in a transverse edge knife roller so that the transverse cutting operation and the cutting out of the pulling end will be possible at the same time.

Referring now more specifically to the drawings and FIGS. 1 and 3 thereof in particular, these figures show a roller 1 with a slot-like recess 2 having arranged therein a knife 3. Knife 3 may have an approximately rectangular contour with semi-circular narrow sides, approximately one half of knife 3 serving as cutting edge 3a for the pulling end to be cut out. The back 3b is ground off so that in the direction of rotation P the first portion only of the knife will become effective.

Around the knife 3 there is provided a clearance 4 so that the knife is movable toward all sides. The knife 3 is held on the roller by two hook-shaped pins 5 and 6 having angled heads for engaging corresponding bores in the knife body. Each pin 5, 6 is fixedly connected to an abutment disc 7, 8 acted upon by a spring 9, 10. These pins 5, 6 are guided in slit bushings 11 and 12 provided with a longitudinal slot 11a, 12a. These bushings are held by clamping screws 13, 14. The abutments 7 and 8 engage the end faces of the bushings 11 and 12. If it is desired to remove the knife from the roller, for instance for post-grinding the same, the hook-shaped pins 5 and 6 are swung pivotally not about their own axis but about axis parallel to the roller axis so as to be withdrawn from the bores of the knife 3, as possible due to space provided by slots 11a, 12a and as indicated by arrows in FIG. 1, whereupon the knife can easily be removed from the roller. When reinserting the knife, the adjustment of the knife as to height can be effected by a corresponding axial adjustment of bushings 11 and 12.

Referring now to the embodiment of FIGS. 4 to 7, this embodiment corresponds to a major extent to that of FIGS. 1 to 3. Also in this instance, a knife 3 is arranged in the slot-like recess 2 of the cutter roller 1. Knife 3 is of an approximately rectangular countour and has semi-circular narrow sides (FIG. 7). Knife 3 is held by two bolts 18 and 19 which are firmly connected to a holding pin 20. The narrow sides of knife 3 are provided with slots 21 adapted to be engaged by holding pins 20 which can be turned into said slots 21 by turning bolts 18 and 19 for instance by means of a screw driver. Bolts 18 and 19 are respectively arranged in bushings 22 which are screwed into bores of roller 1. The lower end of bolts 18 and 19 has arranged therein a transverse pin 23 which, depending on the position of the bushing, is adapted to engage recesses 24 at the lower end of bushing 22. Also with this embodiment, the bolts 18 and 19 are loaded by a spring 25. Roller 1 carries the transverse cutting knife 15 and a pressure beam 16 which is under the load of a spring 17.

When the knife 3 which is held by bolts 18 and 19 is to be removed from the roller, for instance for post-grinding the knife, bolts 18 and 19 will be turned by 90° while at the same time being pressed downwardly so that the holding pins 20 can leave the slots 21 of knife 3. The knife can then be removed from the roller. After the knife has been post-ground so that it also has to be adjusted in the roller, the threaded bushings 22 are turned outwardly. To this end, the bolts 18 and 19 are turned without being pressed downwardly. When turning the holding pins 20 again into the knife 3, the bolts 18 and 19 are pressed downwardly, and the transverse pins 23 are permitted to engage a corresponding recess 24 at the end face of bushing 22.

It is particularly advantageous to arrange a knife 3 of the type described above within a roller 1 which at the same time carries the transverse cutting knife 15. This knife 15 may, in a manner known per se, be built with a pressure beam 16 into a unit, which beam is under the load of spring 17. The pressure beam 16 is adapted to advance the foil. In this way the transverse cutting device and the cutting device for the pulling end are combined in one roller which in a manner known per se cooperates with a smooth steel roller.

This holding structure for knife 3 has the further advantage that when different roller diameters are involved which are due to the shape of the wrapping to be cut off, no adjustment of the band knife is required. Instead, a uniform design of the knife and the holding means therefor can be employed for knife rollers of different diameters.

What I claim is:

1. A cutter for cutting the pulling end of a ripping band of wrappers, which includes: a rotatable roller having slot-like recess means, cutting means having a substantially rectangular contour with semi-circular narrow sides which provide an outward clearance permitting said cutting means to be movable toward all sides and being movably arranged in said slot-like recess means for rotation with said roller, spring means arranged in said roller, and bolt means resiliently supported by said spring means and directly supporting said cutting means.

2. A cutter according to claim 1, provided with bores receiving said spring means and said bolt means longitudinally thereof, and bushings respectively mounted longitudinally in said bores and guiding said bolt means.

3. A cutter according to claim 1, in which the longitudinal axes of said bores are arranged at substantially 90° with regard to the longitudinal axis of said roller and are laterally on each of opposite sides adjacent to said cutter means.

4. A cutter according to claim 2, in which said bushings are slotted in the longitudinal direction thereof for receiving said bolt means which are displaceable laterally in slotted bushings against pressure of said spring means longitudinally in said bores.

5. A cutter according to claim 2, in which said bores and said bushings are provided with intermeshing thread to permit adjustment of said bushings.

6. A cutter according to claim 1, in which said bolt means are provided with disc abutment means for end engagement longitudinally by said spring means.

7. A cutter according to claim 1, in which said cutting means is provided with lateral slots, and in which said bolt means are provided with extension means selectively turnable into and out of said lateral slots.

8. A cutter according to claim 2, in which said bolt means are respectively provided with abutment means in the form of transverse pins respectively extending through said bolt means, and in which that end face of said bushings which is remote from said cutting means is provided with recesses for receiving said transverse pins.

9. A cutter according to claim 1, in which said roller is also provided with transverse cutting means for wrapper transverse cutting and located laterally in between said bolt means supporting said first-mentioned cutting means for cutting the pulling end of the wrapper ripping bands, both said wrapper and ripping band cutting means being combined in said roller.

References Cited

UNITED STATES PATENTS

| | | | |
|---|---|---|---|
| 1,310,922 | 7/1919 | Novick | 83—346 X |
| 2,682,306 | 6/1954 | Schriber | 83—346 |
| 2,801,439 | 8/1957 | Meares | 83—346 X |
| 3,340,757 | 9/1967 | Rudszinat | 83—343 |

FOREIGN PATENTS 920,967  3/1963  Great Britain.

FRANK T. YOST, Primary Examiner

U.S. Cl. X.R.

83—346, 348